United States Patent [19]
Sato et al.

[11] Patent Number: 5,640,610
[45] Date of Patent: Jun. 17, 1997

[54] CAMERA WITH A LINE-OF-SIGHT DETECTING DEVICE

[75] Inventors: Shigemasa Sato, Yokohama; Toshimi Watanabe, Machida; Kenji Tazaki, Funabashi, all of Japan

[73] Assignee: Nikon Corporation, Tokyo, Japan

[21] Appl. No.: 259,128

[22] Filed: Jun. 13, 1994

Related U.S. Application Data

[63] Continuation of Ser. No. 31,114, Mar. 12, 1993, abandoned.

[30] Foreign Application Priority Data

Mar. 18, 1992 [JP] Japan ................................. 4-062373

[51] Int. Cl.$^6$ ................................................ G03B 13/02
[52] U.S. Cl. ........................................................ 396/51
[58] Field of Search ............................... 354/62, 410, 400, 354/219, 204, 195.1, 195.12; 396/51

[56] References Cited

U.S. PATENT DOCUMENTS

| | | | |
|---|---|---|---|
| 4,574,314 | 3/1986 | Weinblutt | 354/400 |
| 5,036,347 | 7/1991 | Tsunekawa et al. | 354/400 |
| 5,155,516 | 10/1992 | Shindo | 354/219 |
| 5,182,443 | 1/1993 | Suda et al. | 354/62 |
| 5,214,466 | 5/1993 | Nagano et al. | 354/62 |
| 5,225,862 | 7/1993 | Nagano et al. | 354/62 |
| 5,245,371 | 9/1993 | Nagano et al. | 354/62 |
| 5,260,734 | 11/1993 | Shindo | 354/219 |

FOREIGN PATENT DOCUMENTS

| | | |
|---|---|---|
| 1-241511 | 9/1989 | Japan. |
| 4-157435 | 5/1992 | Japan. |

*Primary Examiner*—Russell E. Adams

[57] ABSTRACT

A camera with a line-of-sight detecting device, having a light source illuminating an eye of a photographer with light; a conversion device converting reflected light from the illuminated eye to an output corresponding to the intensity of the reflected light; and an eye gazing point determination system identifying an eye-gazing point of the photographer when an output difference or an output ratio between a peak output and a background output of the conversion device is greater than a predetermined value and when the magnitude of a peak output from the conversion device is within a predetermined range.

33 Claims, 15 Drawing Sheets

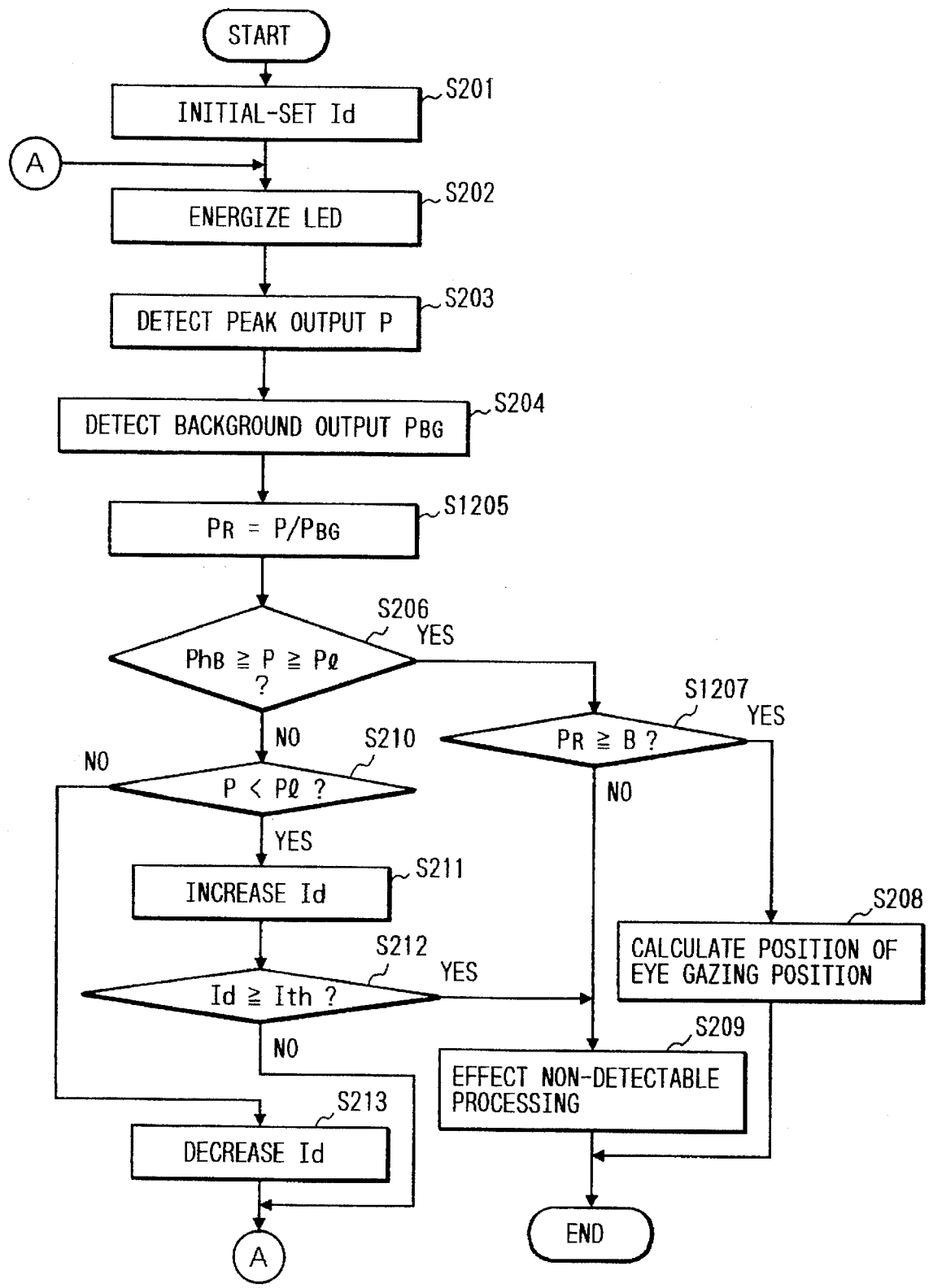

CAMERA WITH A LINE-OF-SIGHT DETECTING DEVICE

This is a continuation of application Ser. No. 08/031,114 filed Mar. 12, 1993, now abandoned.

BACKGROUND OF THE INVENTION

1. Field of the Invention

The present invention relates to a camera with a line-of-sight detecting device incorporating a function to detect a subject serving as a photographing target by detecting a line of sight of the photographer.

2. Related Background Art

According to a typical conventional method of determining a subject serving as a photographing target, an object in the vicinity of the center within a finder is determined as the photographing target. The practice is to detect a distance to this photographing target or detect a brightness thereof.

According to this method, however, free framing is hard to perform. Therefore, a method has been developed in recent years, wherein the photographing target is determined from a line-of-sight direction by detecting a line of sight of the photographer. A known camera utilizing this method is disclosed in, e.g., Japanese Patent Application Laid-Open No. 1-241511.

This camera is constructed to detect the line of sight by illuminating an eyeball of the photographer with infrared light and detecting the reflected light therefrom.

This method, however, presents the following problem. If an eye of the photographer is unobstructed, e.g., by glasses, and is moved to a position close enough for a detector to receive sufficient reflected light from the eyeball, the line of sight can be detected. If the photographer wears eyeglasses, or if the position of the eyeball is spaced apart from the finder, the amount of reflected light from the eyeball is too small, resulting in a drop of precision in detecting the line of sight.

SUMMARY OF THE INVENTION

It is a primary object of the present invention, which has been devised to obviate the problems inherent in the prior art described above, to provide a camera with a line-of-sight detecting device capable of detecting a line of sight with a remarkably higher stability than in the prior art.

To accomplish this object, according to one aspect of the present invention, there is provided a camera with a line-of-sight detecting device comprising: an illuminating means (e.g., 21 in FIG. 2) for illuminating an eye of the photographer with light; a photoelectric converting means (e.g., 28 in FIG. 2) for photoelectrically converting reflected light from the eye illuminated with the light from the illuminating means; an illumination light quantity altering means (e.g., steps S211, S213 in FIG. 14, steps S309, S311 in FIG. 15 and steps S411, S416 in FIG. 16) for obtaining an output difference or output ratio based on a peak output of a photoelectric conversion output of the photoelectric converting means and an output from which the peak output is removed and altering the illumination light quantity of the illuminating means in accordance with the output difference or output ratio; and an arithmetic means (e.g., step S208 in FIG. 13, step S307 in FIG. 15 and step S409 in FIG. 16) for calculating a direction of an eye-gazing point of the photographer based on the output from the photoelectric converting means.

According to the camera with the line-of-sight detecting device of this invention, if a state of the detected reflected light from the eye is not suitable for an accurate detection of the line of sight, a quantity of illumination light from the illuminating means is varied. The reflected light is thereby adjusted to accurately is thereby detect the line of sight.

BRIEF DESCRIPTION OF THE DRAWINGS

Other objects and advantages of the present invention will become apparent during the following discussion in conjunction with the accompanying drawings, in which:

FIGS. 19 to 21 are the modifications of the first to third embodiments, respectively.

DESCRIPTION OF THE PREFERRED EMBODIMENTS

The present invention will hereafter be described in detail with reference to the drawings.

Figure 1:
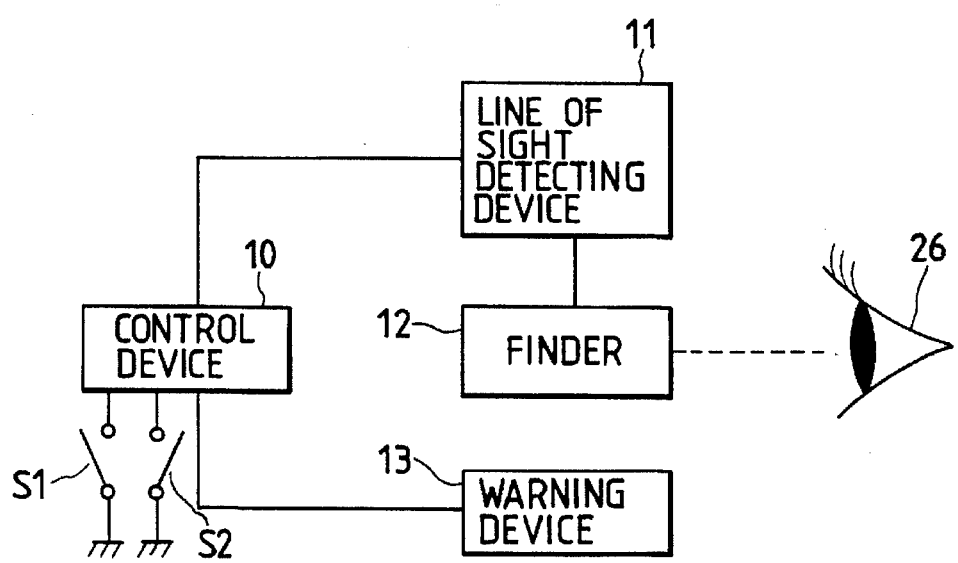
FIG. 1 is a block diagram showing a first preferred embodiment of a camera with a line-of-sight detecting device according to the present invention.

FIG. 1 is a block diagram showing a first preferred embodiment of a camera with a line-of-sight detecting device according to the present invention. The camera with this line-of-sight detecting device includes a control device 10, a line-of-sight detecting device 11, a finder 12 and an alarming device 13.

The CPU-constructed control device 10 calculates a direction of eye-gazing point from a photoelectric conversion output of the line-of-sight detecting device 11.

Further, this control device 10 judges whether or not a line-of-sight detector is in a usable state from the photoelectric conversion output of the line-of-sight detecting device 11. The control device 10 controls an intensity of eyeball illumination light in accordance with a result of this judgment.

Still further, the control device 10 controls, if it is judged that the line-of-sight is undetectable, the alarming device 13 for giving an alarm to the photographer by way of one example of an undetectable process.

The line-of-sight detecting device 11 includes, as will be mentioned later, an illuminating means, a condensing means and a photoelectric converting means.

The alarming device 13 informs the photographer of an undetectable state if it is judged that a reliability of the line-of-sight detecting information is low even when changing the intensity of the illumination light through the control device 10.

The following is one example to inform the photographer of the undetectable state. An alarm is issued by buzzing or flashing or lighting up an alarm light in the finder to inform the photographer of the fact that the line-of-sight can not be detected.

Connected to the control device 10 are a half-depression switch S1 and a full-depression switch S2 of a release button. The camera is brought into an operating state by turning ON the half-depression switch S1. A series of exposing actions are conducted by turning ON the full-depression switch S2.

Figure 2:
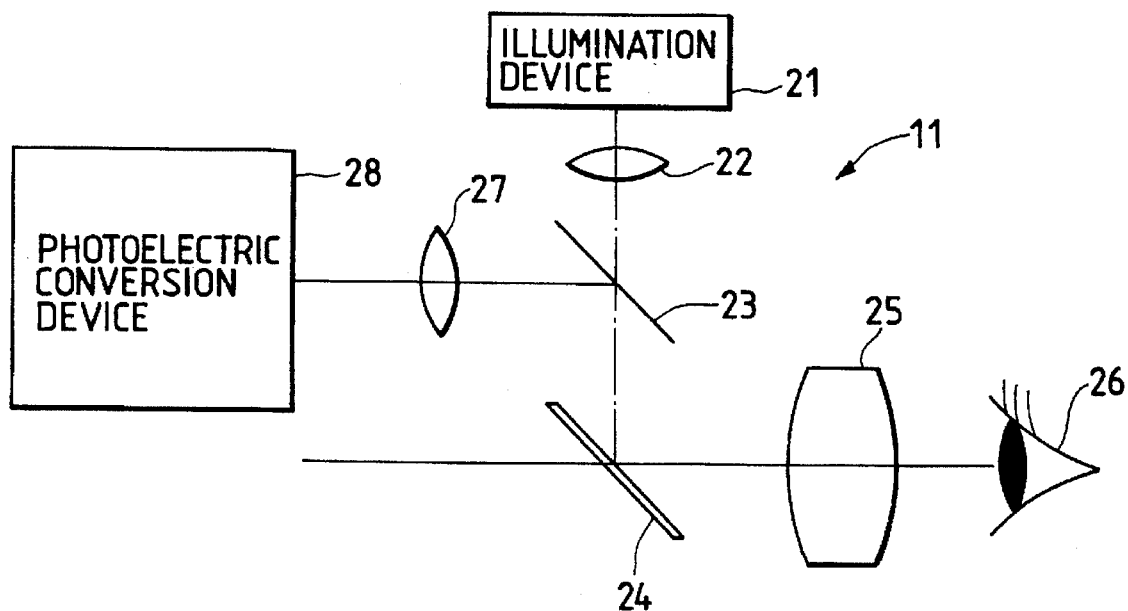
FIG. 2 is an explanatory view illustrating particulars of the line-of-sight detecting means shown in FIG. 1.

FIG. 2 fully illustrates the line-of-sight detecting device 11. In this line-of-sight detecting device 11, an infrared ray emitted from an illumination device 21 is led to an eyeball 26 via an illumination optical system 22, a half-mirror 23, a wavelength selection mirror 24 and an eyepiece 25.

On the other hand, the infrared ray reflected by the eyeball 26 is led to a photoelectric conversion device 28 via the eyepiece 25, the wavelength selection mirror 24, the half-mirror 23 and a condensing optical system 27.

Herein, the illumination device 21 involves the use of an infrared LED so as to avoid glare to the photographer.

The illumination optical system 22 is constructed in combination with the eyepiece 25 to illuminate the entire eyeball 26 with the light.

The wavelength selection mirror 24 is constructed to transmit a visible ray but reflect the infrared ray with which the eyeball 26 is illuminated.

The half-mirror 23 is constructed to transmit and reflect the infrared ray. For maximizing a gain of the photoelectric conversion device 28 with respect to the infrared ray, however, both a reflectivity and a transmittance of the half-mirror 23 are set to approximately 50%.

The condensing optical system 27 cooperates with the eyepiece 25 to reform a reflection image of the eyeball 26 on the photoelectric conversion device 28.

The photoelectric conversion device 28 effects a photoelectric conversion of the reflected light from the eyeball 26. The photoelectric conversion device 28 involves the use of a plurality of CCDs or SPDs arranged in a one-dimensional or two-dimensional array. Explained in connection with this embodiment is a case in which CCDs or SPDs are arranged in a one-dimensional array.

A photoelectric conversion output from this photoelectric conversion device 28 undergoes an A/D conversion in an A/D converter (not shown). A distribution of intensities of the reflected light is inputted to the control device 10.

Figure 3A:
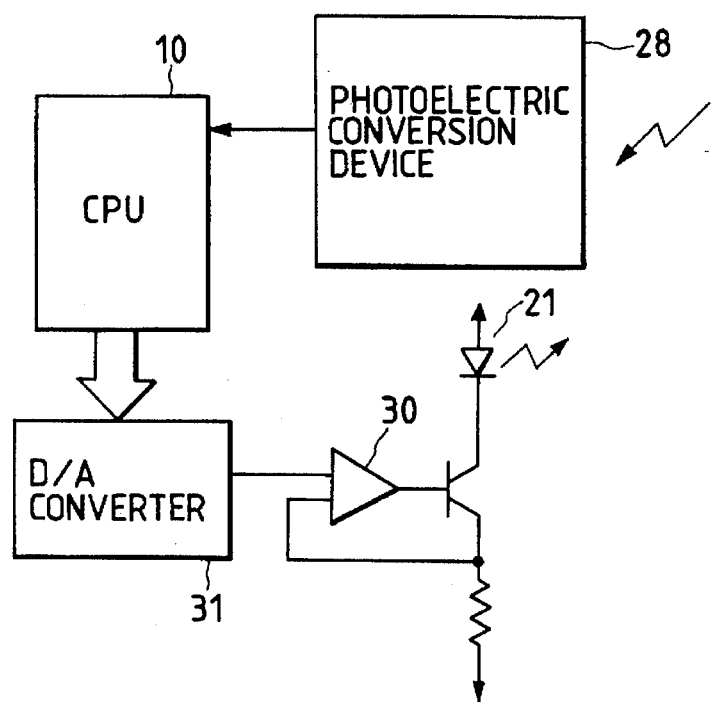
FIGS. 3A and 3B are explanatory diagrams showing output examples of a photoelectric conversion device both in a bright reflection and in a dark reflection.
Figure 3B:
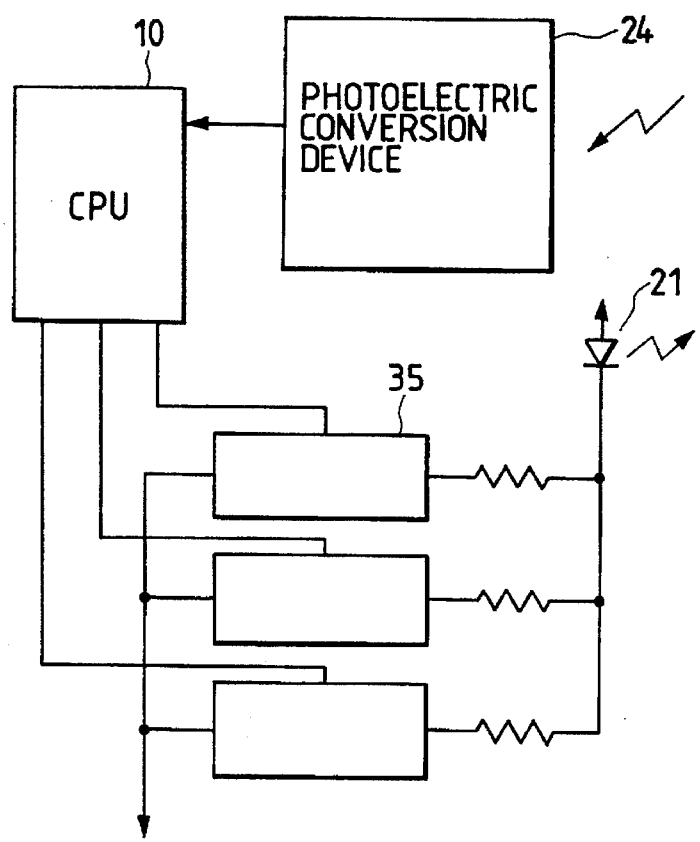

FIGS. 3A and 3B show examples of circuits for making an amount of electric current supplied to an illumination LED variable in accordance with an instruction of the control device 10. Explaining the example shown in FIG. 3A, the photoelectric conversion device 28 is composed of the CCD or SPD array. The photoelectric conversion device 28 includes an interface for outputting a voltage corresponding to the light received. The voltage outputted from the photoelectric conversion device 28 is supplied to the A/D conversion circuit in the CPU 10. Further, a light intensity of the illumination LED 21 is determined by the current flowing thereto. The current is, however, controlled by an OP amplifier 30. The OP amplifier 30 is controlled by a voltage output of a D/A converter 31.

A digital value inputted to the D/A converter 31 is supplied from the CPU 10. If an input value from the photoelectric conversion device 28 is small, the digital value is set for the D/A converter to enhance the light intensity of the LED 21.

The example shown in FIG. 3B will be explained. The construction is basically the same as that in FIG. 3A. However, the current value imparted to the LED 21 is not continuously variable. Instead the CPU 10 selectively switches over a switching means 35 (transmission gate, etc.) to alter a load resistance. The arrangement can be, although not continuously variable, more simplified than in the example of FIG. 3A.

Figure 4A:
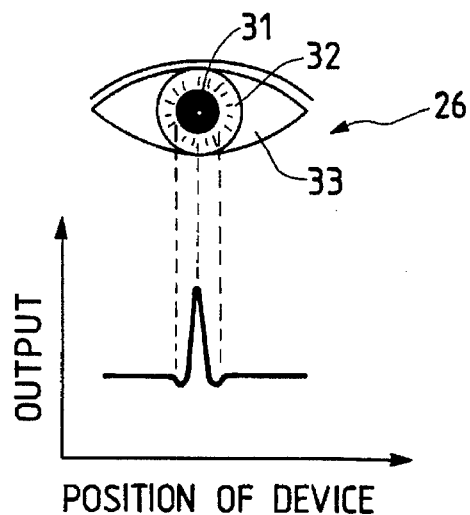
FIGS. 4A to 4C are explanatory diagrams each illustrating an output example of the photoelectric conversion device.
Figure 4B:
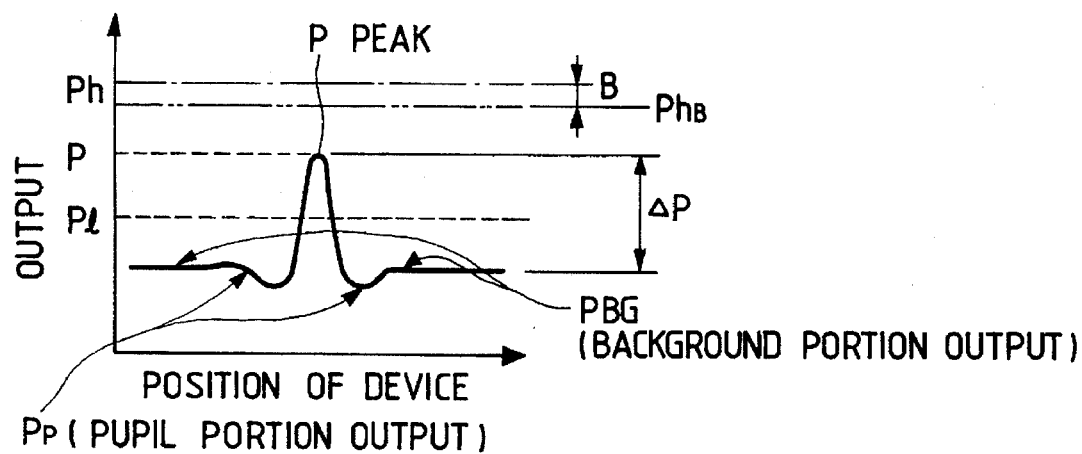
Figure 4C:
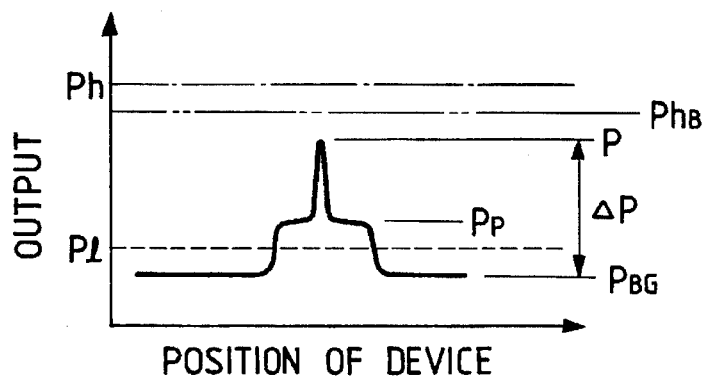

FIGS. 4A, 4B and 4C show examples of outputs of the photoelectric conversion device 28 that depend on intensities of the reflected light of the eyeball 26. FIGS. 4A and 4B each illustrate a state of dark reflection, while FIG. 4C shows a state of bright reflection.

The state of dark reflection herein implies a state where there is almost no reflection from a pupil portion 31, and the pupil portion 31 therefore appears dark. The state of bright reflection implies a state where there is a bright reflection from the pupil portion 31, and the pupil portion 31 appears like, e.g., a red eye.

In these Figures, the axis of the ordinate indicates an output of the photoelectric conversion device 28, while the axis of the abscissa indicates a position of the photoelectric conversion device 28.

Also, the symbol Ph represents a saturation output of the photoelectric conversion device 28, and P1 designates a lower limit value with which the reliability is obtained as line-of-sight detecting information.

PhB represents a value to which the saturation output Ph is reduced by a predetermined value B. The value PhB is an upper limit value with which the reliability is obtained.

A distribution of outputs shown in FIGS. 4B and 4C will be described in detail.

A beam reflected by the cornea among beams of reflected light from the eyeball 26 is shown by a peak output P. This is known as a Purkinje image and serves to form an image of luminescent point on the photoelectric conversion device 28 through the condensing optical system 27.

Namely, as stated in the known technology, it is possible to know an amount of turn of the eyeball 26, i.e., an eye-gazing point, by detecting a position of this luminescent point. Then, it is required that the luminescent point be discriminated to specify the position of this luminescent point. It is also necessary to obtain an output of the luminescent point where sufficient resolving power is to be obtained.

Pupil portion outputs Pp relative to the reflected light from the pupil portion 31 are obtained on both sides of the peak output P.

Obtained also on both sides are background outputs PBG relative to the reflected light from an iris portion 32 and a white-of-eye portion 33 as well.

FIG. 4C shows one example of the distribution of outputs of the reflected light from the eyeball 26 in the state of bright reflection. The pupil portion outputs Pp relative to the reflected light from a retina are gained on both sides of the peak output P. In the state of this bright reflection, however, the pupil portion output Pp is larger than the background output PBG.

The following is a detailed explanation about a variety of output states of the photoelectric conversion device 28 in conjunction with FIGS. 5 through 12.

Figure 5:
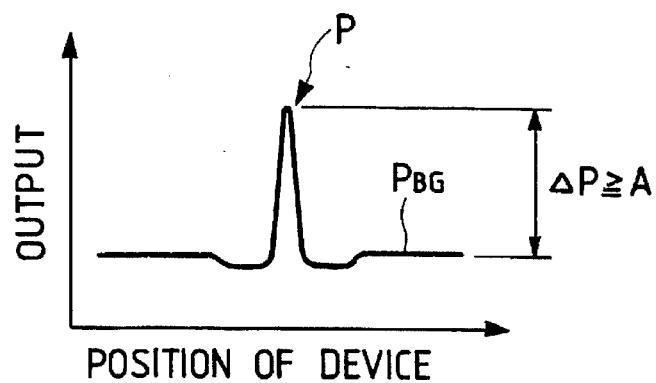
FIG. 5 is an explanatory diagram showing an output example of the photoelectric conversion device.

FIG. 5 shows an output state where an output difference ΔP between the peak output P and the background output PBG is greater than a predetermined value A. Depending on magnitudes of the peak output P, the output state is classified into those shown in FIGS. 6 through 8.

Figure 6:
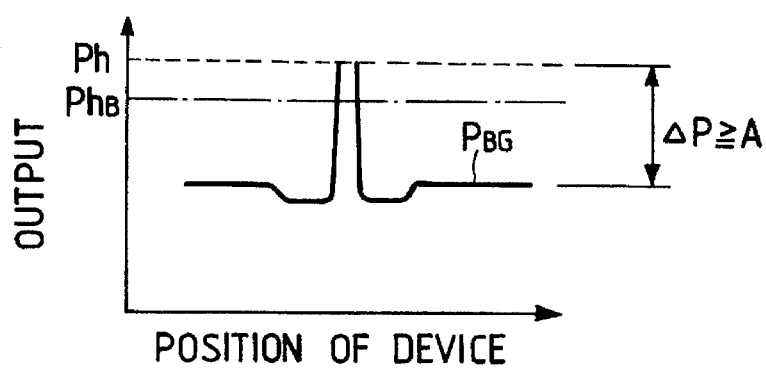
FIG. 6 is an explanatory diagram showing an output example of the photoelectric conversion device.

To be specific, FIG. 6 illustrates a saturated state where the peak output P is larger than the upper limit value PhB. In this instance, the position of the luminescent point obtained becomes inaccurate.

Figure 7:
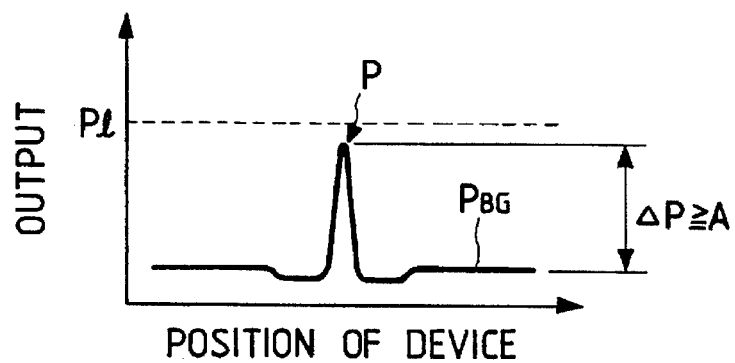
FIG. 7 is an explanatory diagram showing an output example of the photoelectric conversion device.

FIG. 7 shows a state where the peak output P is smaller than the lower limit value Pl. In this case, the line-of-sight information lacks reliability.

Figure 8:
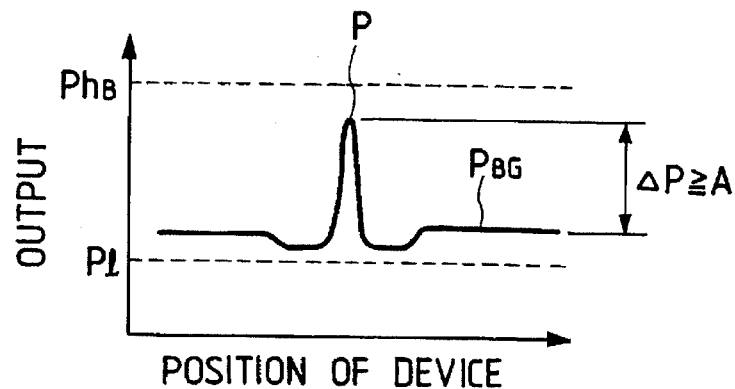
FIG. 8 is an explanatory diagram showing an output example of the photoelectric conversion device.

FIG. 8 illustrates a state where the peak output P exists between the upper limit value PhB and the lower limit value Pl, and the line-of-sight detecting information is of high reliability. In this instance, a position of the eye-gazing point can be calculated.

Figure 9:
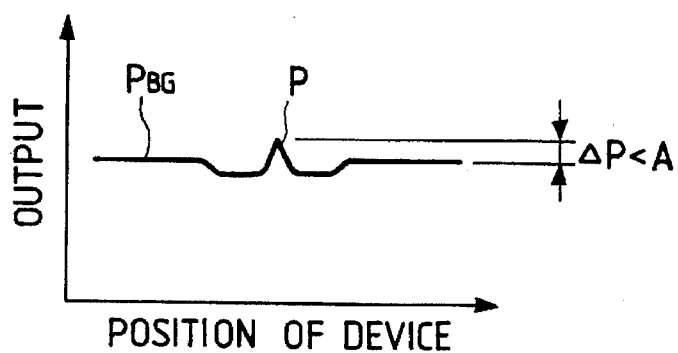
FIG. 9 is an explanatory diagram showing an output example of the photoelectric conversion device.

On the other hand, FIG. 9 shows an output state where the difference ΔP between the peak output P and the background output PBG is smaller than the predetermined value A. In this instance, it is judged that the line-of-sight information lacks reliability irrespective of a magnitude of the peak output P.

Figure 10:
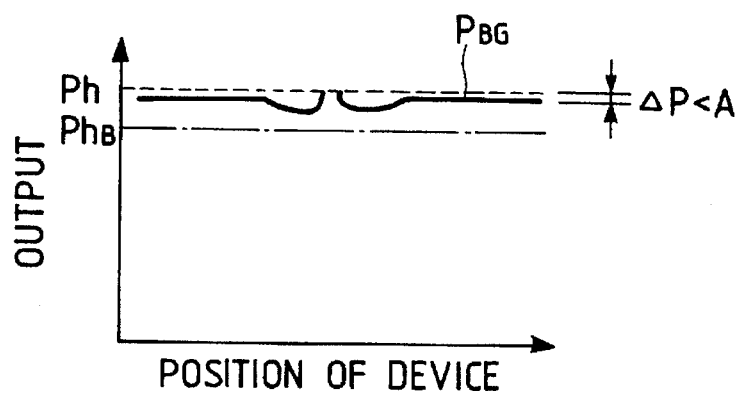
FIG. 10 is an explanatory diagram showing an output example of the photoelectric conversion device.
Figure 11:
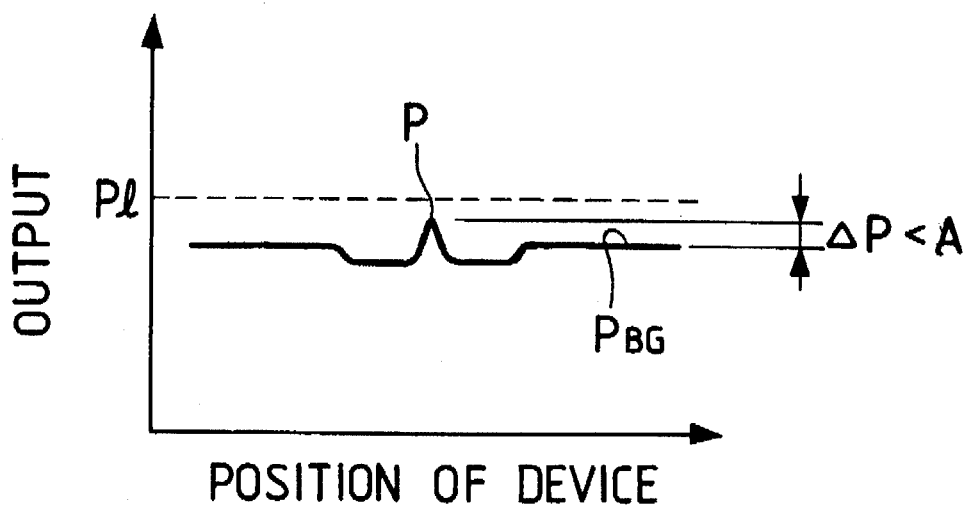
FIG. 11 is an explanatory diagram showing an output example of the photoelectric conversion device.
Figure 12:
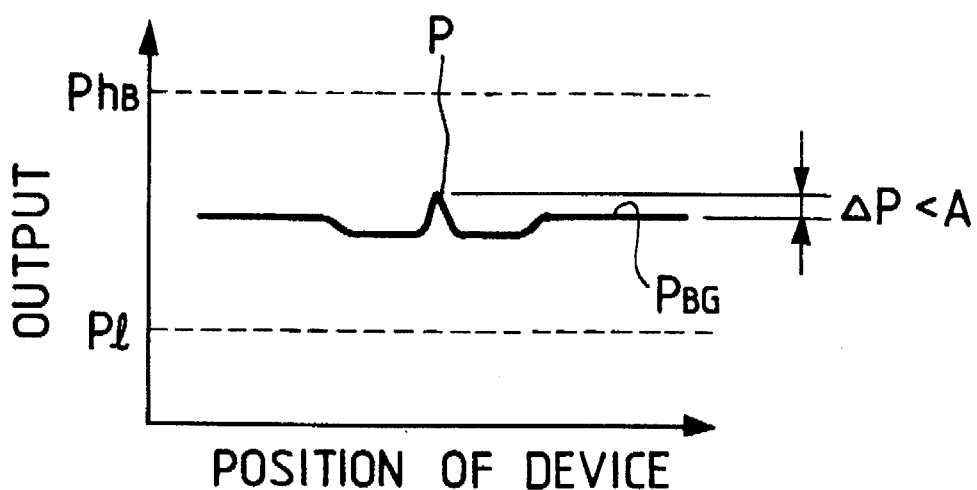
FIG. 12 is an explanatory diagram showing an output example of the photoelectric conversion device.

Then, the output state in this case is classified into those shown in FIGS. 10 through 12.

That is, FIG. 10 shows a saturated state where the peak output P is greater than the upper limit value PhB.

FIG. 11 illustrates a state where the peak output P is smaller than the lower limit value Pl.

FIG. 12 shows a state where the peak output P exists between the upper limit value PhB and the lower limit value Pl. In this instance, it is judged that the line-of-sight is undetectable.

Figure 13:
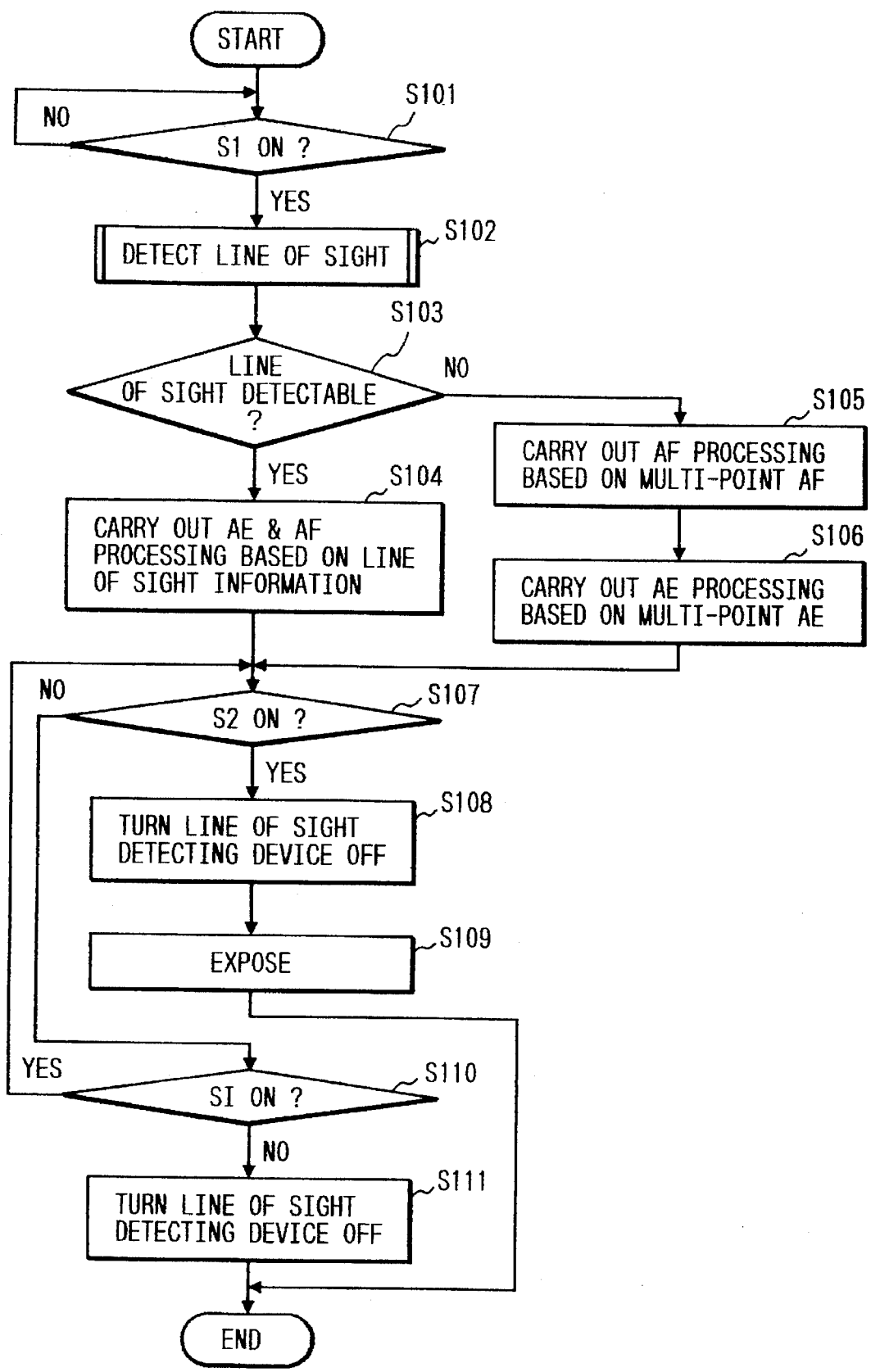
FIG. 13 is a flowchart showing the first embodiment of the camera with the line-of-sight detecting device.

The operation of the camera with the line-of-sight detecting device in this embodiment will be described in detail with reference to a flowchart of FIG. 13.

In this embodiment, it is first judged whether the half-depression switch S1 is turned ON or not. If the swith S1 is not turned ON, this step is repeated until this switch is turned ON (step S101).

If the half-depression switch S1 is turned ON, the line-of-sight detecting device 11 is operated to detect a line of sight (step S102). The details of the line of sight detection will be described later.

Thereafter, whether the line of sight is detectable or not is judged (step S103). If the line of sight is judged to be detectable, AE and AF processing is performed based on the line-of-sight detecting information obtained (step S104).

If the line of sight is judged to be undetectable, the AF processing is carried out based on multi-point AF without using the line-of-sight detecting information, by way of one example of undetectable processing (step S105). Thereafter, the AE processing is similarly conducted based on multi-point AE without employing the line-of-sight detecting information (step S106).

Judged next is whether the release switch S2 is turned ON or not (step S107).

If the release switch S2 is turned ON, the line-of-sight detecting device 11 is turned OFF (step S108). Thereafter, a series of actions for photographing is initiated, and exposing is conducted (step S109). The operation is thus finished.

If the release switch S2 is turned OFF, whether or not the release switch S1 is in the ON-state is judged (step S110). If in the ON-state, the action proceeds again to step S107. Whereas if in the OFF-state, it is judged that photographing should not be done. The line-of-sight detecting device 11 is then turned OFF (step S111). The operation thus comes to an end.

Figure 14:
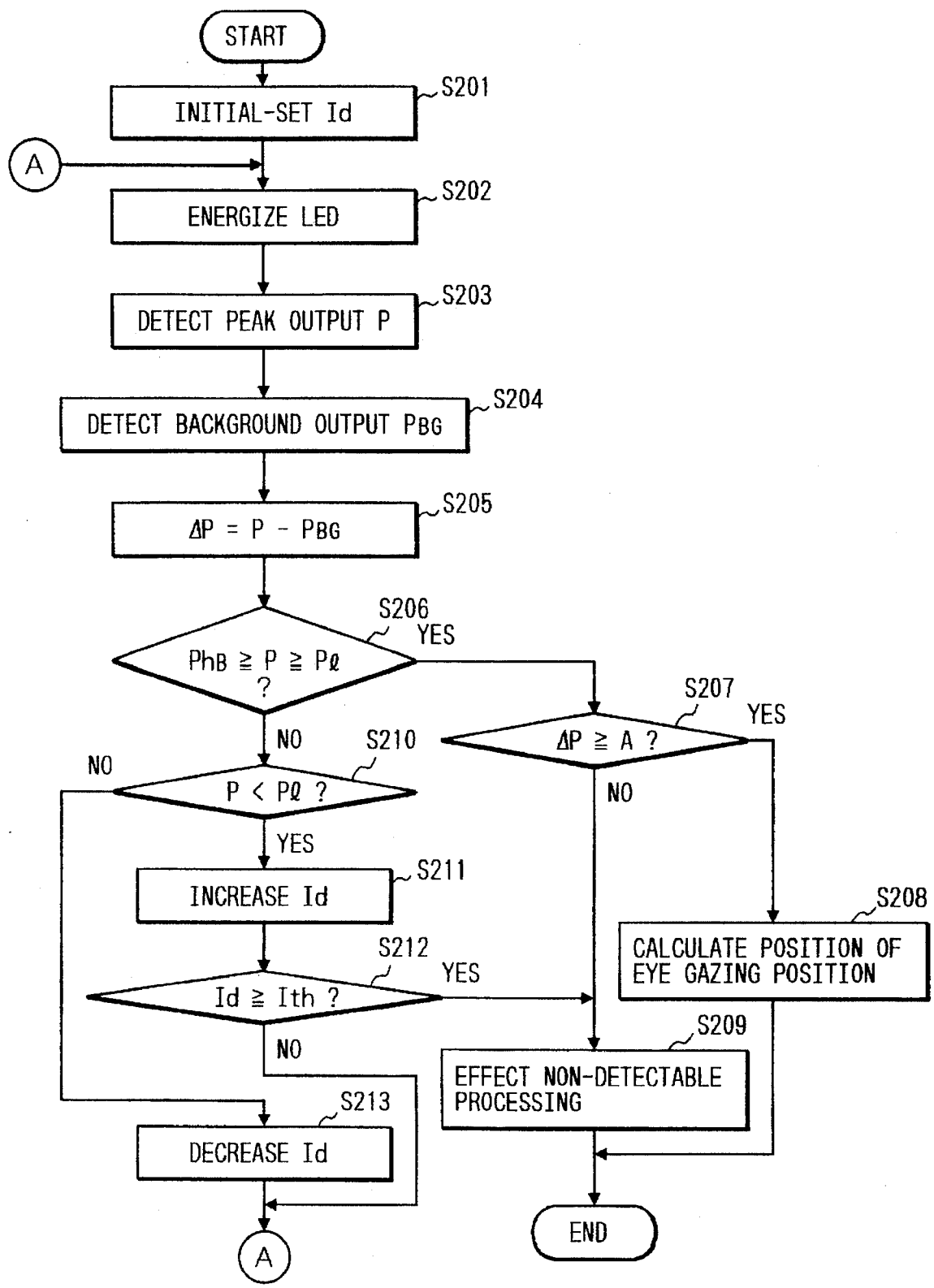
FIG. 14 is a flowchart showing the particulars of steps of detecting the line of sight shown in FIG. 12.

FIG. 14 shows a subroutine to detect the line of sight in step S102 described above.

In accordance with this embodiment, when the magnitude of peak output P falls within a predetermined range, it is judged that the line-of-sight detecting information is reliable. A position of the eye-gazing point is calculated.

To start with, an LED driving current Id of the illumination device 21 is initialized based on the data stored beforehand (step S201).

Next, the LED of the illumination device 21 is caused to emit the light by the initialized LED driving current Id (step S202).

Detected thereafter is the output maximum value, i.e., the peak output P from the A/D conversion output of the photoelectric conversion device 28 receiving the reflected light from the eyeball 26 (step S203).

Next, the background output PBG shown in FIG. 3B is detected from the A/D conversion output of the photoelectric conversion device 28 receiving the reflected light from the eyeball 26 (step S204).

Then, the output difference ΔP between the detected peak output P and the background output PBG is obtained such as: ΔP=P−PBG (step S205).

Next, the previously stored upper limit value PhB and lower limit value Pl are compared with the peak output P (step S206).

When PhB≧P≧Pl, the peak output P falls within the predetermined range. It is therefore judged that the line-of-sight detecting information is reliable. The output difference ΔP is compared with the predetermined value A stored beforehand (step S207).

Then, when ΔP≧A, the position of the eye-gazing point is calculated from the A/D conversion output of the photoelectric conversion device 28 (step S208). Note that the known method of calculating the position of the eye-gazing point may be applicable as a calculation method but is not particularly limited.

When ΔP≧A is not valid, as shown in e.g., FIG. 12, the output difference ΔP is smaller than the predetermined value A. It is therefore judged that the precise eye-gazing point can not be obtained. Undetectable processing is performed (step S209).

While in step S206, if the peak output P does not fall within a range of PhB≧P≧P1, whether the peak output P is smaller than the lower limit value P1 or larger than the upper limit value PhB is judged (step S210).

When P<P1, this implies the state shown in, e.g., FIG. 11. Hence, the LED driving current Id is updated to increase so that the peak output P is capable of gaining the reliability in the form of line-of-sight detecting information. An LED light emission quantity is thereby controlled (step S211).

Then, the next step is to judge whether or not the updated LED driving current Id exceeds the maximum LED driving current Ith (step S212). If Id≧Ith, the undetectable processing is executed to avoid the eyeball 26 from being unnecessarily irradiated with the infrared ray (step S209).

While in step S210, when P<P1 is not valid, as shown in, e.g., FIG. 6, the LED driving current Id is decreased to establish P≧PhB because of P>PhB. The LED light emission quantity is thus controlled (step S213).

In the camera with the line-of-sight detecting device stated earlier, a precision of detecting the line of sight when the LED of the illumination device 21 emits the light in accordance with the initialized current quantity is judged from the output difference between the peak output of the reflected light from the eyeball 26 and the output from which the peak output is removed. The current quantity is controlled to increase the reflected light enough to detect the line of sight. If enough reflected light to detect the line of sight is not obtained even when reaching a preset current quantity, the photographer is informed of this by an alarm. It is thus possible to detect the line of sight with a high reliability and stability. Further, it is feasible to prevent both a futile detection of the line of sight and the eyeball 26 of the photographer from being irradiated with a greater amount of light than required.

Figure 15:
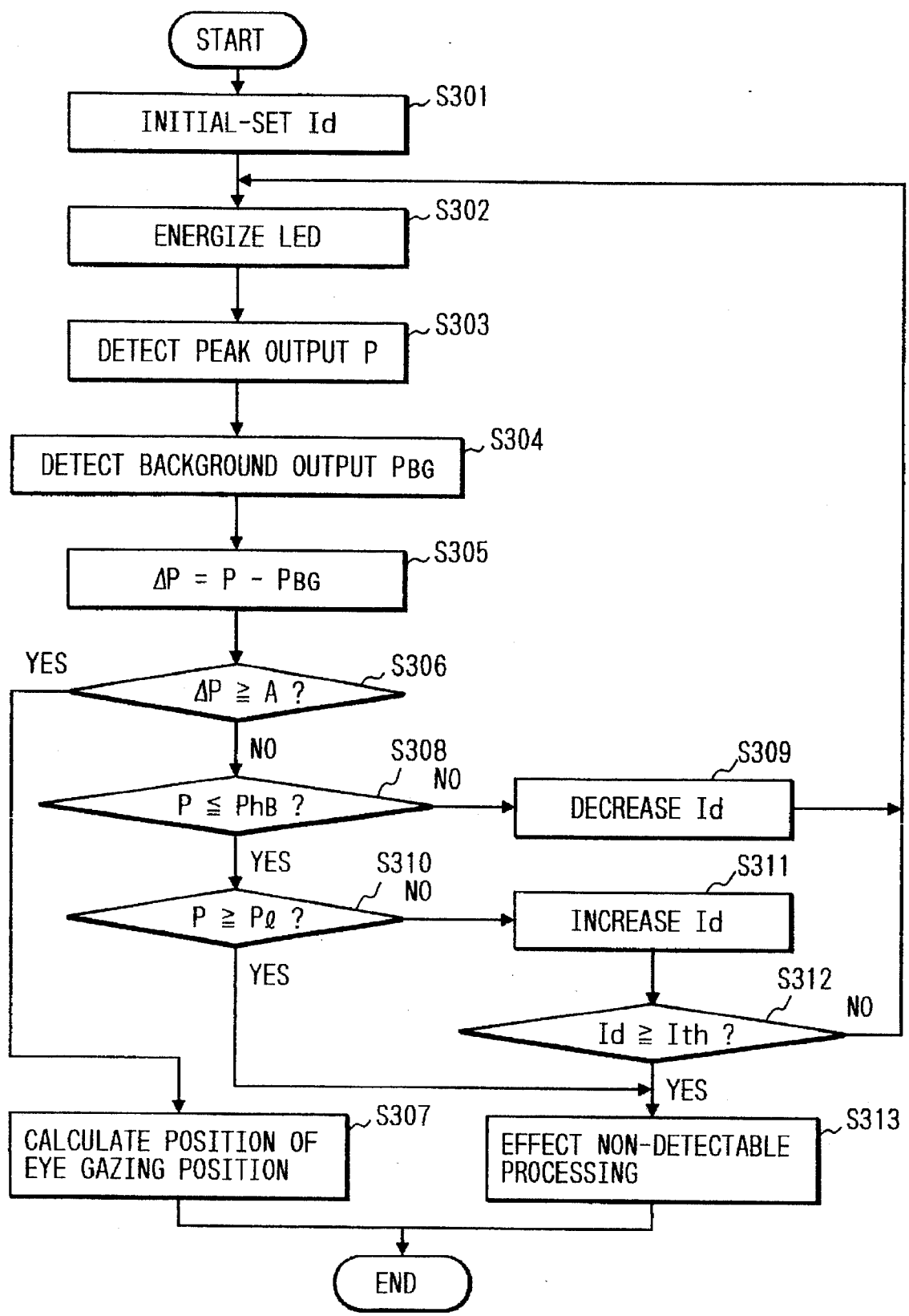
FIG. 15 is a flowchart showing a second preferred embodiment of the camera with the line-of-sight detecting device according to the present invention.

FIG. 15 shows a second embodiment of the present invention. In this embodiment, only the subroutine of the line-of-sight detection in step S102 described above is altered as shown in FIG. 15.

In accordance with this embodiment, if a magnitude of the output difference ΔP is larger than the predetermined value, the position of the eye-gazing point is calculated irrespective of a magnitude of the peak output P. Thus, the necessity for judging the reliability depending on the magnitude of the peak output P is eliminated.

First, the LED driving current Id is initialized based on the data stored beforehand (step S301).

Next, the background output PBG shown in FIG. 3B is detected from the A/D conversion output of the photoelectric conversion device 28 receiving the reflected light from the eyeball 26 (step S304).

Subsequently, the output difference ΔP between the detected peak output P and the background output PBG is obtained such as: ΔP=P−PBG (step S305).

Next, whether or not the output difference ΔP is larger than the predetermined value A is judged (step S306). If ΔP≧A, the position of the eye-gazing point is calculated from the A/D conversion output of the photoelectric conversion device (step S307). Note that the known method of calculating the position of the eye-gazing point may be applicable as a calculation method but is not particularly limited.

Whereas if ΔP<A, whether or not the peak output P is greater than the upper limit value PhB is judged (step S308).

When P>PhB, the LED driving current Id is decreased so as to establish P≧PhB (step S309). The LED light emission quantity is thus controlled, and the action goes back to step S302.

On the other hand, when P≦PhB, whether or not the peak output P is larger than the lower limit value P1 is judged (step S310). When P≧P1, the action proceeds to step S313. When P<P1, the LED driving current Id is increased so that the peak output P gains the reliability as the line-of-sight detecting information. The LED light emission quantity is thus controlled (step S311).

Judged subsequently is whether the updated LED driving current Id exceeds the maximum LED driving current Ith (step S312). If Id≧Ith is not valid, the action returns to step S302.

Whereas if Id≧Ith, as shown in, e.g., FIG. 11, the output difference between ΔP is smaller than the predetermined value A, and the peak output P is smaller than the lower limit value P1. Hence, it is judged that a precise eye-gazing point is not obtainable. The undetectable processing is carried out (step S313).

The camera with the thus constructed line-of-sight detecting device is capable of exhibiting substantially the same effects as those in the first embodiment. In accordance with the second embodiment, if the magnitude of the output difference ΔP is larger than the predetermined value A, the position of the eye-gazing point is calculated irrespective of a magnitude of the peak output P. The necessity for judging the reliability depending on the magnitude of the peak output P is thereby eliminated. The arithmetic can be simplified.

Figure 16:
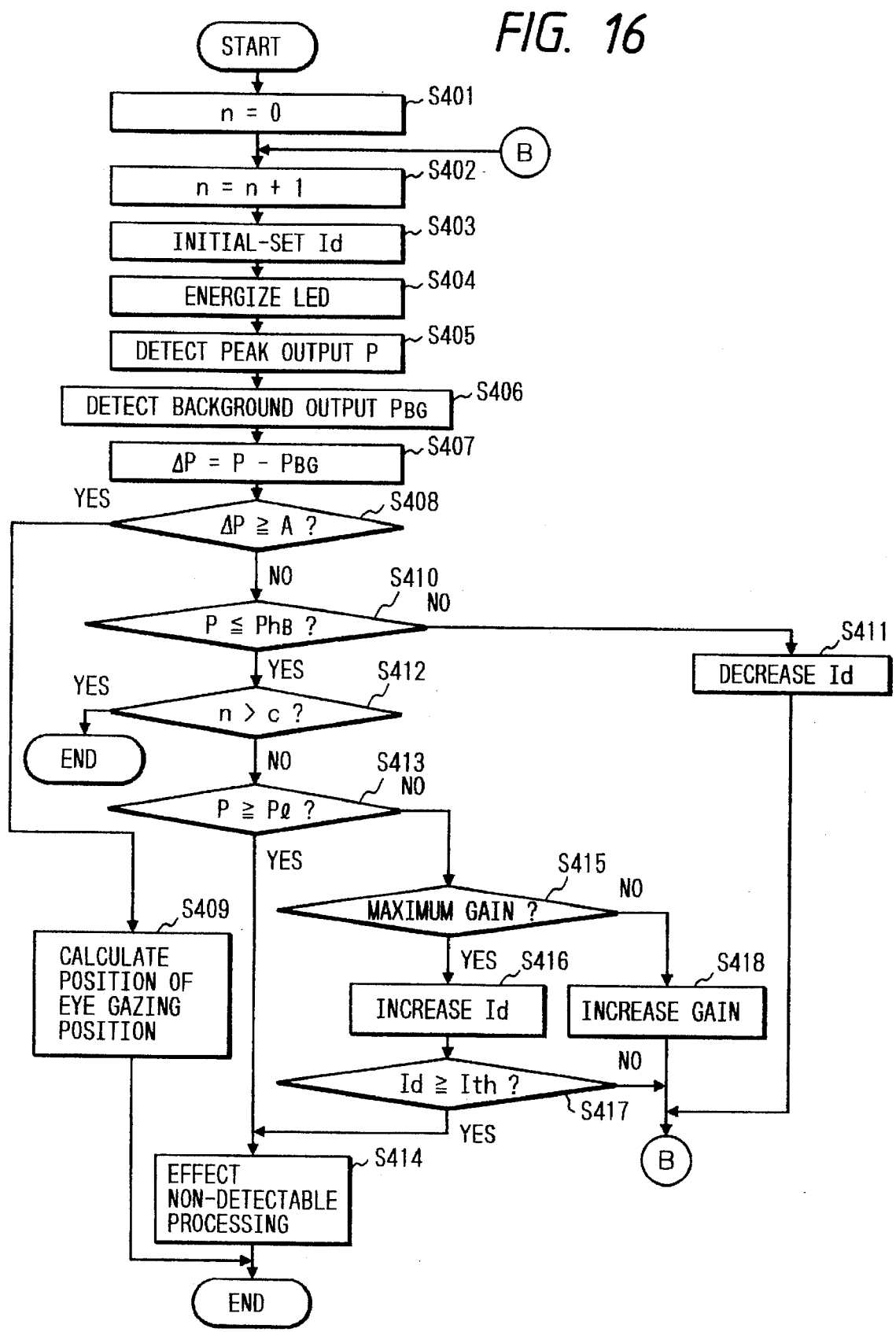
FIG. 16 is a flowchart showing a third preferred embodiment of the camera with the line-of-sight detecting device of this invention.

FIG. 16 shows a third embodiment of the present invention. In this embodiment, only the subroutine of the line-of-sight detection shown in step S102 described above is altered as illustrated in FIG. 15.

In accordance with this embodiment, in addition to the second embodiment, the line-of-sight detection is forcibly ended if the line-of-sight detecting information serving to calculate the position of the eye-gazing point can not be obtained even by effecting the detection of the eye-gazing point with a predetermined number of repetitions.

First, the variable n for counting the number of repetitions of the line-of-sight detecting action is set to 0 (step S401).

Next, the variable n is increased by one (step S402).

Thereafter, the LED driving current Id is initialized based on the data previously stored (step S403).

Subsequently, the LED emits the light by the set LED driving current Id (step S404).

After this step, the peak output P is detected from the A/D conversion output of the photoelectric conversion device 28 receiving the reflected light from the eyeball 26 (step S405).

Next, the background output PBG shown in FIG. 3B is detected from the A/D conversion output of the photoelectric conversion device 28 receiving the reflected light from the eyeball 26 (step S406).

Subsequently, the output difference ΔP between the detected peak output P and the background output PBG is obtained such as: ΔP=P−PBG (step S407).

Next, whether or not the output difference ΔP is larger than the predetermined value A is judged (step S408). If ΔP≧A, the position of the eye-gazing point is calculated from the A/D conversion output of the photoelectric conversion device (step S409). Note that the known method of calculating the position of the eye-gazing point may be applicable as a calculation method but is not particularly limited.

If ΔP<A, whether or not the peak output P is greater than the upper limit value PhB is judged (step S410). When P>PhB, the LED driving current Id is decreased so as to establish P≦PhB (step S411). The LED light emission quantity is thus controlled, and the action goes back to step S402.

When P≦PhB, the repetitive count number n is compared with a predetermined value C (step S412). If n is greater than the number-of-times C, the line-of-sight detection is forcibly finished.

Whereas if the repetitive number is equal to or smaller than the number-of-times C, whether the peak output P is larger than the lower limit value P1 or not is judged (step S413). When P≧P1, the undetectable processing is conducted (step S414).

When P≧P1 is not valid, whether or not a present gain of the detection system of the photoelectric conversion device 28 reaches the maximum is judged (step S415). If maximum, the LED driving current Id is increased (step S416). Judged thereafter is whether or not the LED driving current Id exceeds the maximum LED driving current Ith (step S417). When Id≧Ith is not valid, the action goes back to step S402. When Id≧Ith, the undetectable processing is effected to avoid the eyeball from being unnecessarily irradiated with the infrared ray (step S414).

While in step S415, if the present gain of the detection system does not reach the maximum, the gain is enhanced (step S418, and the action returns to step S402.

The camera with the thus constructed line-of-sight detecting device is capable of exhibiting substantially the same effects as those in the second embodiment. In accordance with this embodiment, if enough line-of-sight detecting information to calculate the position of the eye-gazing point can not be obtained even by performing the detection of the eye-gazing point with the predetermined number of repetitions, the line-of-sight detection is forcibly ended. The unnecessary arithmetic can be therefore eliminated.

Further, in accordance with this embodiment, the gain of the detection system of the photoelectric conversion device 28 is also varied. It is therefore possible to detect the line of sight more surely and stably.

Note that the embodiments discussed above deal with the example where the output difference ΔP between the peak output P and the background output PBG is given by: ΔP=P−PBG. The present invention is not, however, limited to such embodiments. For instance, an output difference ΔP between the peak output P and the pupil portion output Pp may be, as a matter of course, given such as: ΔP=P−Pp.

Further, the judgment as to whether the line of sight is detectable may be made depending not on a magnitude of the output difference ΔP between the peak output P and the background output PBG (or the pupil portion output Pp), but on a ratio PR of the background output PBG (or the pupil portion output Pp) to the peak output P, wherein the ratio is expressed such as: PR=P/PBG (or P/Pp), or alternatively, PR=PBG/P (or Pp/P).

Figure 20:
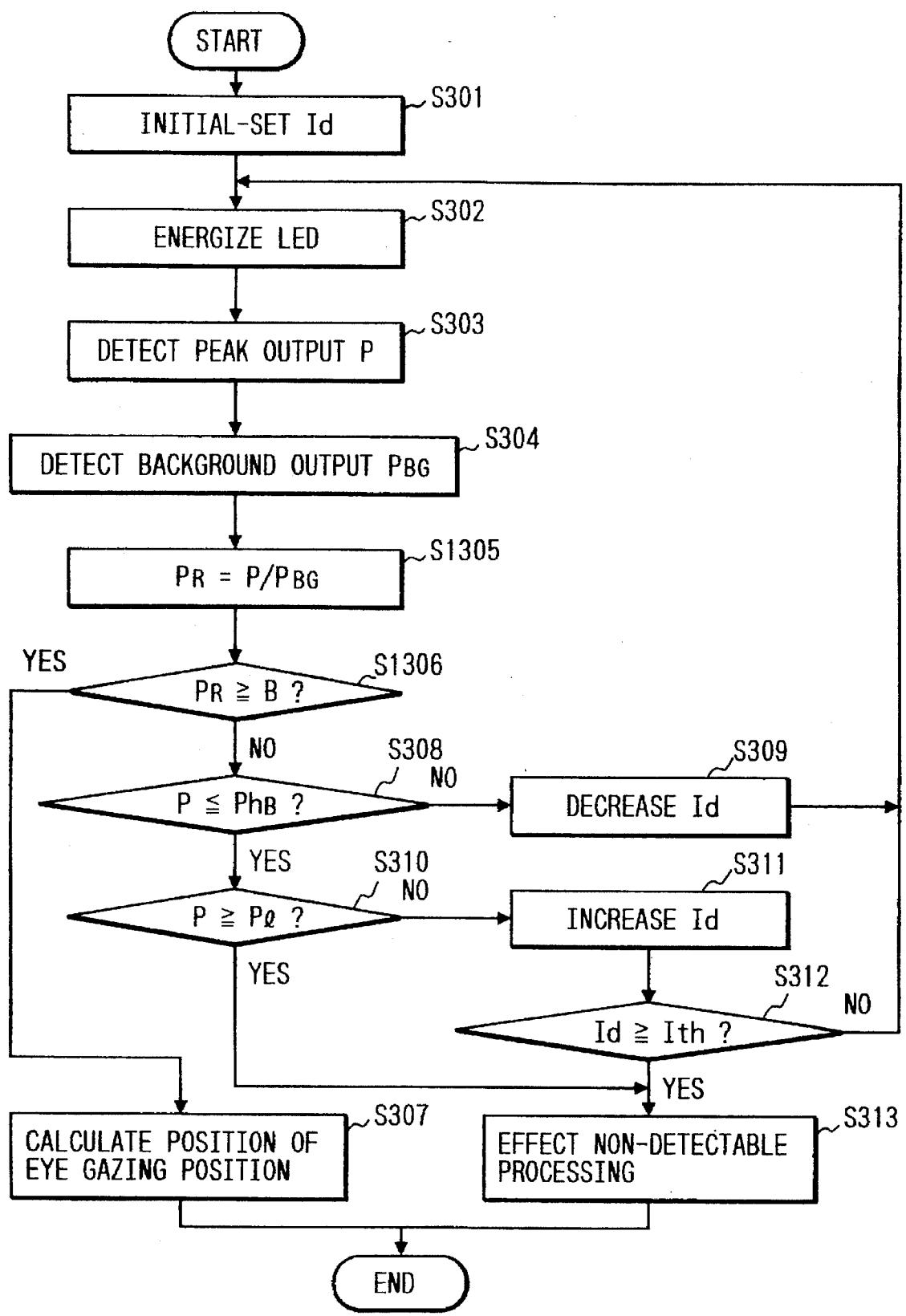
Figure 21:
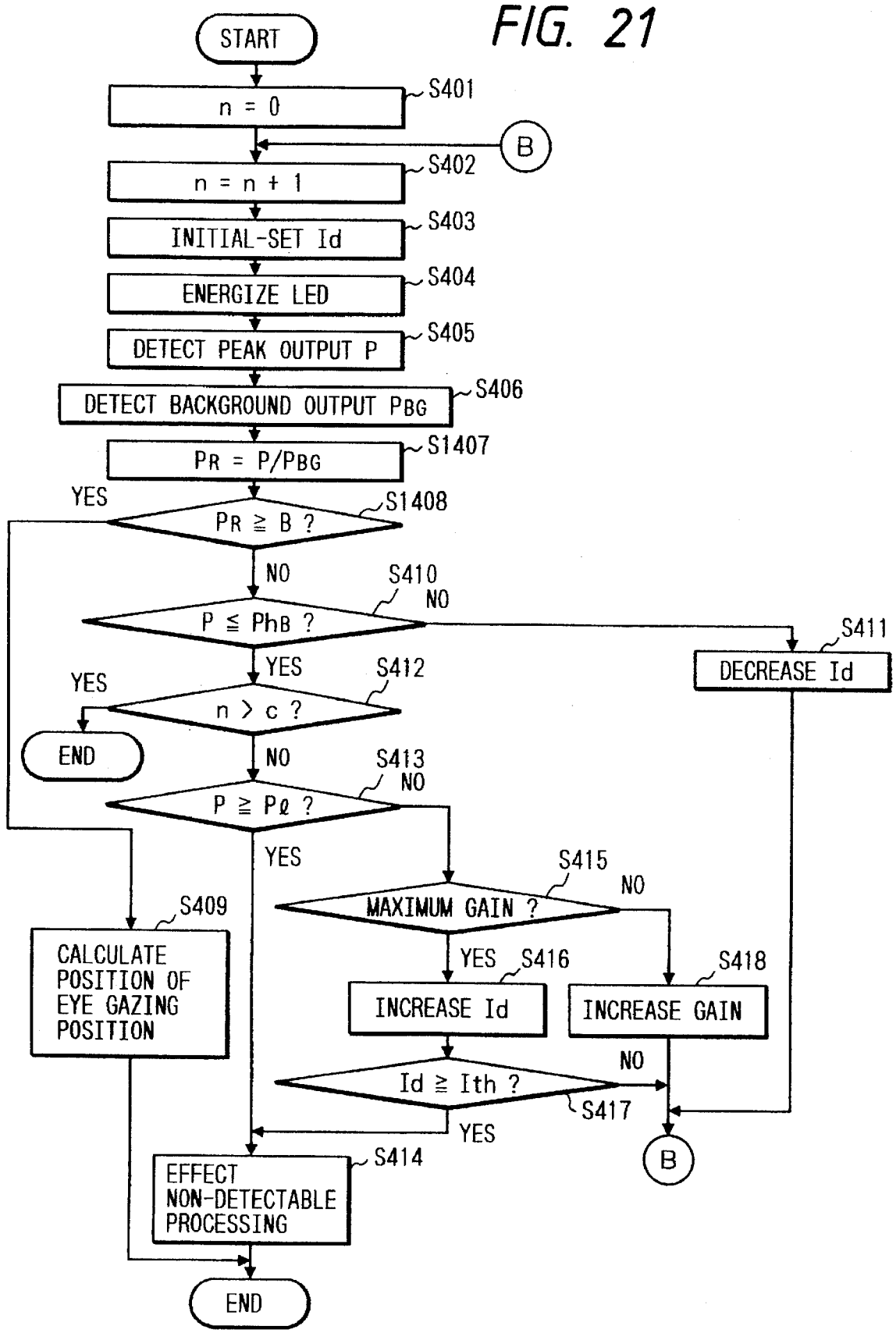

FIGS. 19 to 21 show the embodiments in which the line of sight is detected by the ratio. The embodiment shown in FIG. 14 differs from the first embodiment shown in FIG. 19 in steps S1205 and S1207. The embodiment shown in FIG. 20 differs from the second embodiment shown in FIG. 15 in steps S1305 and S1306. The embodiment shown in FIG. 21 differs from the third embodiment shown in FIG. 16 in steps S1407 and S1408. The ratio $P_R$ is obtained in steps S1205, S1305 and S1407. The ratio $P_R$ is compared with a predetermined value B in steps S1207, S1306 and S1408.

Incidentally, the practicable arrangement in this case may be a simple replacement of the judgment as to whether the line of sight is detectable or not in each embodiment discussed above.

Furthermore, the embodiment described above has dealt with the example of judging whether or not the LED driving current Id exceeds the maximum LED driving current Ith to avoid the eyeball 26 from being unnecessarily irradiated with the infrared ray. The present invention is not, however, limited to such embodiments. For example, when the photoelectric conversion device 28 is a charge accumulation device such as a CCD, etc., the arrangement may turn out as shown in FIGS. 17A, 17B, 18A, and 18B.

Figure 17A:
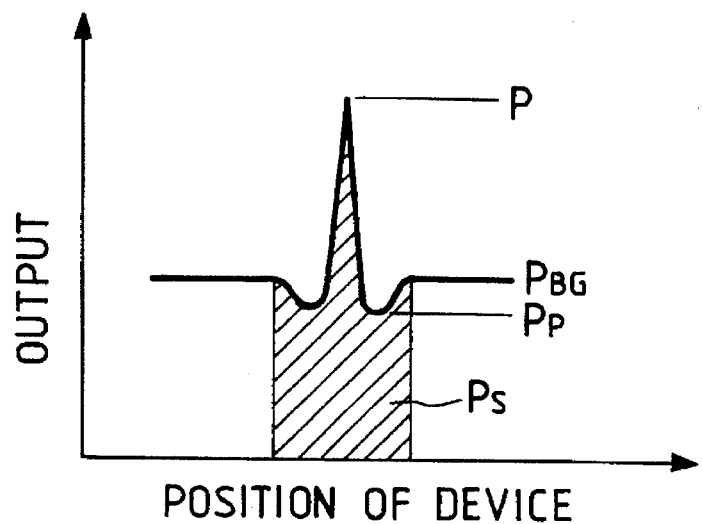
FIGS. 17A and 17B are explanatory diagrams showing one example of an undetectable processing when the photoelectric conversion device is a charge accumulation device.
Figure 17B:
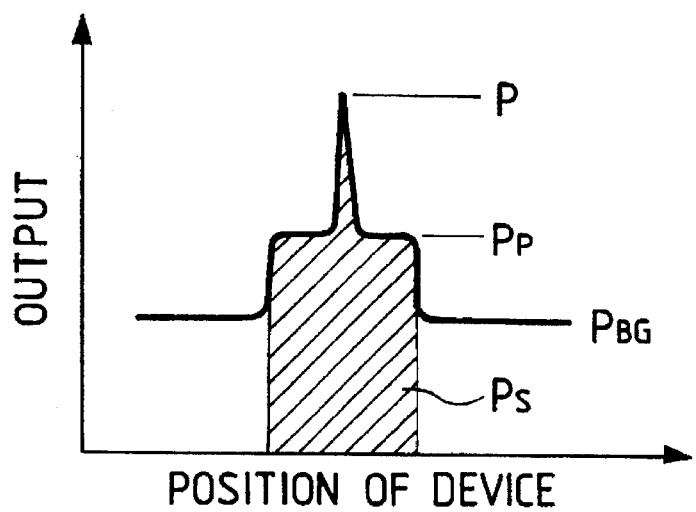

That is, FIG. 17A shows a case where the reflection of the pupil portion is defined as a dark reflection. FIG. 17B shows a case where the reflection of the pupil portion is defined as a bright reflection.

Note that an accumulation time t is controlled by the CPU so as to automatically change (AGC) depending on an intensity of the light incident on the CCD.

In these cases, when dividing the peak output P by the accumulation time t, there is judged whether or not this value has a relationship with the predetermined value Pth as expressed by P/t≧Pth. When P/t≧Pth, the undetectable processing may be done. When dividing an area PS with oblique lines in the Figure by the accumulation time t, there is further judged whether or not this value has a relationship with the predetermined value Pth as expressed by PS/t≧Pth. When PS/t≧Pth, the undetectable processing may be performed.

Figure 18A:
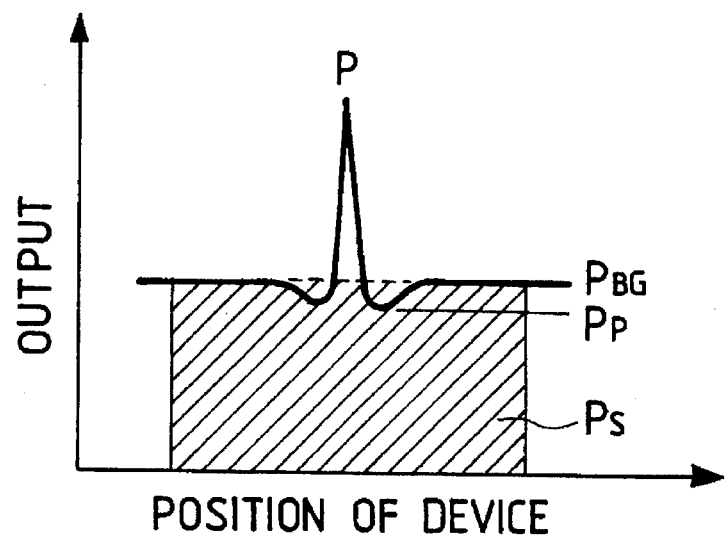
FIGS. 18A and 18B are explanatory diagrams showing another example of the undetectable processing when the photoelectric conversion device is the charge accumulation device.
Figure 18B:
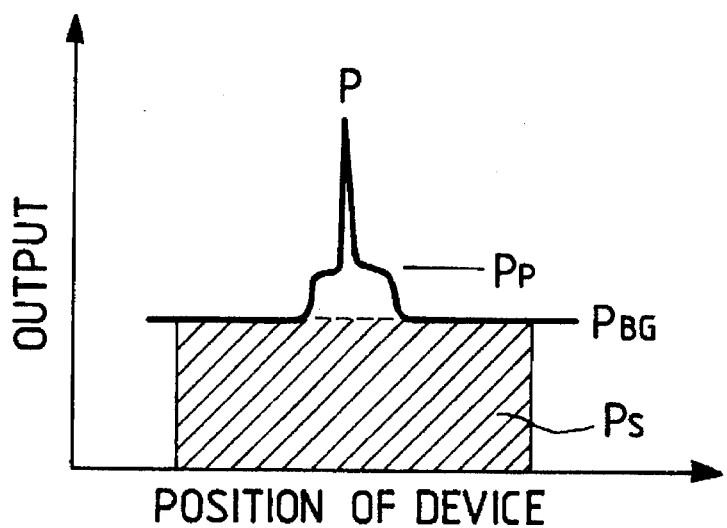

FIG. 18A shows a case where the reflection of the pupil portion is defined as a dark reflection. FIG. 18B shows a case where the reflection of the pupil portion is defined as a bright reflection. In these cases, the peak output P projecting from the background output PBG is not employed. When dividing the background output PBG by the accumulation time t, there is judged whether or not this value has a relationship with the predetermined value Pth as expressed by PBG/t≧Pth. When PBG/t≧is valid, the undetectable processing may be conducted. Further, when dividing the area PS with the oblique lines in the Figure by the accumulation time t, there is judged whether or not this value has a relation with the predetermined value Pth as expressed by PS/t≧Pth. When PS/t≧Pth, the undetectable processing may be executed.

Incidentally, the accumulation time t of the CCD is not AGC-controlled but is accumulated for a fixed time. In this case, it is possible to employ the CCD output or the area with the oblique lines in the Figure without using the value divided by the accumulation time t described above.

As discussed above, according to the present invention, if a state of the reflected light from the eye that is detected by the photoelectric converting means is not suitable for detecting the line of sight with certainty, the following step is taken. The amount of illumination light from the illuminating means is varied so that the reflected light assumes a state sufficient to detect the line of sight with certainty. Consequently, the line of sight can be detected with high reliability. At the same time, the stable line-of-sight detection can be done. Further, it is feasible to prevent both the futile line-of-sight detection and the eye of photographer from being irradiated with a greater amount of light than needed.

It is apparent that a wide range of different working modes can be formed without deviating from the spirit and scope of the invention. This invention is not restricted by its specific working modes except being limited by the appended claims.

What is claimed is:

1. A camera with a line-of-sight detecting device, comprising:
    an illuminating source to illuminate an eye of a photographer with light;
    a photoelectric converting device to photoelectrically convert reflected light from the illuminated eye to a photoelectric conversion output;
    an illumination light quantity altering device to obtain an output difference between a peak output of a photoelectric conversion output of said photoelectric converting device and a portion of said photoelectric conversion output excluding the peak output, and to alter an illumination light quantity of said illuminating source in accordance with the output difference; and
    an arithmetic device to calculate a direction of an eye-gazing point of the photographer based on the output from said photoelectric converting device.

2. A camera with a line-of-sight detecting device according to claim 1, wherein said illumination light quantity altering device alters the illumination light quantity when the output difference is smaller than a predetermined value, further including an undetectable processing device to effect undetectable processing when the output difference is less than the predetermined value even with the altered illumination light quantity.

3. A camera with a line-of-sight detecting device according to claim 1, wherein said illumination light quantity altering device reduces the illumination light quantity of said illuminating source when the peak output reaches an upper limit value of the photoelectric conversion output and when the output difference is smaller than a predetermined value.

4. A camera with a line-of-sight detecting device according to claim 1, wherein said illumination light quantity altering device increases the illumination light quantity of said illuminating source when the peak output is less than a lower limit value of the photoelectric conversion output and when the output difference is not greater than a predetermined value.

5. A camera with a line-of-sight detecting device according to claim 1, wherein said illumination light quantity altering device increases the illumination light quantity of said illuminating source when the peak output is less than a lower limit value of the photoelectric conversion output.

6. A camera with a line-of-sight detecting device according to claim 1, wherein said illumination light quantity altering device reduces the illumination light quantity of said illuminating source when the peak output is greater than an upper limit value of the photoelectric conversion output.

7. A camera with a line-of-sight detecting device, comprising:
    an illuminating source to illuminate an eye of a photographer with light;
    a photoelectric converting device to photoelectrically convert reflected light from the illuminated eye to a photoelectric conversion output;
    an illumination light quantity altering device to obtain an output ratio of a peak output of a photoelectric conversion output of said photoelectric converting device to a portion of said photoelectric conversion output excluding said peak output, and to alter the illumination light quantity of said illuminating source in accordance with the output ratio; and
    an arithmetic device to calculate a direction of an eye-gazing point of the photographer based on the output from said photoelectric converting device.

8. A camera with a line-of-sight detecting device according to claim 7, wherein said illumination light quantity altering device alters the illumination light quantity when the output ratio is smaller than a predetermined value, further including an undetectable processing device to effect undetectable processing when the output ratio does not reach the predetermined value even with the altered illumination light quantity.

9. A camera with a line-of-sight detecting device according to claim 7, wherein said illumination light quantity altering device reduces the illumination light quantity of said illuminating source source when the peak output reaches an upper limit value of the photoelectric conversion output and when the output ratio is not greater than a predetermined value.

10. A camera with a line-of-sight detecting device according to claim 7, wherein said illumination light quantity altering device increases the illumination light quantity of said illuminating source when the peak output is less than a lower limit value of the photoelectric conversion output and when the output ratio is not greater than a predetermined value.

11. A camera with a line-of-sight detecting device, comprising:
    an illuminating source to illuminate an eye of a photographer with light;
    a photoelectric converting device to photoelectrically convert reflected light from the illuminated eye to a photoelectric conversion output;
    a gain control device to obtain an output difference between a peak output of a photoelectric converting device and a portion of said photoelectric conversion output excluding said peak output, and to control a gain of the photoelectric converting device in accordance with the output difference; and
    an arithmetic device to calculate a direction of an eye-gazing point of the photographer based on the output from said photoelectric converting device.

12. A camera with a line-of-sight detecting device, comprising:
    an illuminating source to illuminate an eye of a photographer with light;
    a photoelectric converting device to photoelectrically convert reflected light from the illuminated eye to a photoelectric conversion output;
    an output difference controlling device to obtain an output difference between a peak output of the photoelectric conversion output of said photoelectric converting device and portion of said photoelectric conversion output excluding said peak output, and to control the output difference; and
    an arithmetic device to calculate a direction of an eye-gazing point of the photographer based on the output from said photoelectric converting device.

13. A camera having a line-of-sight detecting device in which an eye of a photographer is illuminated by a light source, reflected light is photoelectrically converted by a photoelectric conversion device to generate an output for detecting a line-of-sight direction of the photographer, and an autofocusing device with a plurality of autofocusing areas, the camera comprising:
    a control device to determine an output difference between a peak output and a background output from the photoelectric conversion device to compare the output difference with a predetermined value, and to identify an eye-gazing point of the photographer based on a result of the comparison between the output difference and the predetermined value.

14. A camera according to claim 13, wherein said control device identifies the eye-gazing point of the photographer when the output difference exceeds the predetermined value.

15. A line-of-sight detecting device in which an eye of a photographer is illuminated by light from a light source, and reflected light from the illuminated eye is converted by a photoelectric conversion device to generate an output for detecting a line-of-sight direction of the photographer, the detecting device comprising:
- a control device to determine an output difference between a peak output and a background output from the photoelectric conversion device and to compare the output difference to a predetermined value; and
- a warning device to generate a warning signal when the output difference exceeds the predetermined value.

16. A camera having a line-of-sight detecting device in which an eye of a photographer is illuminated by light from a light source, and reflected light from the illuminated eye is photoelectrically converted by a photoelectric conversion device to generate an output for detecting a line-of-sight direction of the photographer, the camera comprising:
- a control device to determine an output difference between a peak output and a background output from the photoelectric conversion device and to compare the output difference to a predetermined value; and
- a stopping device to stop the detection of a line-of-sight direction of the photographer by said line-of-sight detecting device when comparisons by said control device exceeds a predetermined number of comparisons.

17. A camera with a line-of-sight detecting device, comprising:
- a light source illuminating an eye of a photographer with light;
- a conversion device converting reflected light from the illuminated eye to an output corresponding to the intensity of the reflected light; and
- a control device identifying an eye-gazing point of the photographer when an output difference between a peak output and a background output from said conversion device is greater than a predetermined value.

18. A camera as in claim 17, wherein said control device further bases the identification of the eye gazing point upon the magnitude of the peak output from said conversion device being within a predetermined range.

19. A camera as in claim 17, wherein said control device varies the intensity of the illumination of said light source when the magnitude of the peak output from said conversion device exceeds a predetermined range.

20. A camera as in claim 14, wherein said control device generates a warning signal after a predetermined number of variations in the intensity of the illumination of said light source have been made.

21. A camera as in claim 14, wherein said control device stops varying the intensity of the illumination of said light source after a predetermined number of variations have been made.

22. A camera with a line-of-sight detecting device, comprising:
- a light source for illuminating an eye of a photographer with light;
- a conversion device converting reflected light from the illuminated eye to an output corresponding to the intensity of the reflected light; and
- a control device identifying an eye-gazing point of the photographer when an output ratio between a peak output and a background output from said conversion device is greater than a predetermined value.

23. A camera as in claim 22, wherein said control device further bases the identification of the eye gazing point upon the magnitude of the peak output from said conversion device being within a predetermined range.

24. A camera as in claim 22, wherein said control device varies the intensity of the illumination of said light source when the magnitude of the peak output from said conversion device exceeds a predetermined range.

25. A camera as in claim 24, wherein said control device generates a warning signal after a predetermined number of variations in the intensity of the illumination of said light source have been made.

26. A camera as in claim 24, wherein said control device stops varying the intensity of the illumination of said light source after a predetermined number of variations have been made.

27. A method for obtaining the eye gazing position of a photographer through a lens in a camera comprising the steps of:
- (a) illuminating an eye of the photographer with light;
- (b) converting the reflected light from the illuminated eye to an output corresponding to the intensity of the reflected light; and
- (c) determining the eye gazing position when an output difference between a peak output and a background output from step (b) is greater than a predetermined value.

28. A method as in claim 27, wherein step (c) comprise the substep (c1) of bypassing the determination of the eye gazing point of the eye of the photographer when the magnitude of the peak output from step (b) exceeds a predetermined range.

29. A method as in claim 27, further comprising the step (d) of varying the illumination on the eye of the photographer when the magnitude of the peak output from step (b) exceeds a predetermined range.

30. A camera with a line-of-sight detecting device, comprising:
- an illuminating source to illuminate an eye of a photographer with light;
- a photoelectric converting device to photoelectrically convert reflected light from the illuminated eye to a photoelectric conversion output;
- an illumination light quantity altering device to obtain an output difference between a peak output of a photoelectric conversion output of said photoelectric converting device and a portion of said photoelectric conversion output excluding the peak output, and to alter an illumination light quantity of said illuminating source in accordance with the peak output and the output difference; and
- an arithmetic device to calculate a direction of an eye-gazing point of the photographer based on the output from said photoelectric converting means.

31. A camera with a line-of-sight detecting device, comprising:
- an illuminating source to illuminate an eye of a photographer with light;
- a photoelectric converting device to photoelectrically convert reflected light from the illuminated eye to a photoelectric conversion output;
- an illumination light quantity altering device to obtain an output ratio of a peak output of a photoelectric conversion output of said photoelectric converting device to a portion of said photoelectric conversion output excluding said peak output, and to alter the illumination light quantity of said illuminating source in accordance with the peak output and the output ratio; and an arithmetic device to calculate a direction of an eye-gazing point of the photographer based on the output from said photoelectric converting device.

32. A camera with a line-of-sight detecting device, comprising:

an illuminating source to illuminate an eye of a photographer with light;

a photoelectric converting device to photoelectrically convert reflected light from the illuminated eye to a photoelectric conversion output;

a gain control device to obtain an output difference between a peak output of a photoelectric converting device and a portion of said photoelectric conversion output excluding said peak output, and to control a gain of the photoelectric converting device in accordance with the peak output and the output difference; and an arithmetic device to calculate a direction of an eye-gazing point of the photographer based on the output from said photoelectric converting device.

33. A camera with a line-of-sight detecting device, comprising:

an illuminating source to illuminate an eye of a photographer with light;

a photoelectric converting device to photoelectrically convert reflected light from the illuminated eye to a photoelectric conversion output;

an output difference controlling device to obtain an output difference between a peak output of the photoelectric conversion output of said photoelectric converting device and a portion of said photoelectric conversion output excluding said peak output, and to control the peak output and the output difference; and an arithmetic device to calculate a direction of an eye-gazing point of the photographer based on the output from said photoelectric converting device.

* * * * *

UNITED STATES PATENT AND TRADEMARK OFFICE
CERTIFICATE OF CORRECTION

PATENT NO. : 5,640,610
DATED : June 17, 1997
INVENTOR(S) : Sato et al.

It is certified that error appears in the above-identified patent and that said Letters Patent is hereby corrected as shown below:

Col. 12, line 12 (claim 9), delete "source" (second occurrence).

Col. 13, line 36 (claim 17), "illuminating" should be --to illuminate--.
Col. 13, line 38 (claim 17), "converting" should be --to convert--.
Col. 13, line 41 (claim 17), "identifying" should be --to identify--.

Col. 13, line 63 (claim 22), "for illuminating" should be --to illuminate--.
Col. 13, line 65 (claim 22), "converting" should be --to convert--.
Col. 14, line 1, (claim 22), "identifying" should be --to identify--.

Signed and Sealed this

Eleventh Day of November, 1997

Attest:

BRUCE LEHMAN

Attesting Officer      Commissioner of Patents and Trademarks